(12) United States Patent  (10) Patent No.: US 6,568,753 B1
Watanabe  (45) Date of Patent: May 27, 2003

(54) VEHICULAR SEAT

(75) Inventor: Yoichi Watanabe, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 207 days.

(21) Appl. No.: 09/594,722

(22) Filed: Jun. 16, 2000

(30) Foreign Application Priority Data

Jun. 18, 1999 (JP) .......................................... 11-172765

(51) Int. Cl.[7] .............................................. B60R 21/055
(52) U.S. Cl. ................................................. 297/216.12
(58) Field of Search .......................... 297/216.12, 391, 297/408, 410

(56) References Cited

U.S. PATENT DOCUMENTS 5,378,043 A    1/1995  Viano et al. ................. 297/408
5,938,279 A *  8/1999  Schubring et al. ...... 297/216.12
6,019,424 A *  2/2000  Ruckert et al. ......... 297/216.12
6,199,947 B1 * 3/2001  Wiklund ................. 297/216.12
6,250,714 B1 * 6/2001  Nakano et al. ......... 297/216.12

* cited by examiner

Primary Examiner—Peter R. Brown
(74) Attorney, Agent, or Firm—Foley & Lardner

(57) ABSTRACT

A headrest (7) is mounted to a seat back (3) and movable forward from a set position, a linking mechanism (19) is provided on the seat back (3) for transmitting an inertial force due to the load by a passenger's body acting on the seat back (3), causing the headrest (7) to move forward, a detector (21) performs a detection of contact of the passenger'body with the headrest (7), and a canceler (23) cancels transmission of the inertial force by the linking mechanism (19) when contact of the passenger's body with the headrest (7) is detected by the detector (21).

12 Claims, 16 Drawing Sheets

(CONDITION A)

(CONDITION B)

VEHICULAR SEAT

BACKGROUND OF THE INVENTION

The present invention relates to a vehicular seat having an improved headrest mounting structure.

This type of vehicular seat in the past has been disclosed in U.S. Pat. No. 5,378,043. In this vehicular seat, when the vehicle is subjected to a rear-end collision, an inertial force causes the upper body of the passenger to push a pressure-receiving member within the seat back relatively toward the rear of the vehicle, this force being used to move the headrest toward the front of the vehicle and upward with respect to the vehicle, thereby effecting an early restraint of the passenger's head.

SUMMARY OF THE INVENTION

In this vehicular seat, however, the configuration is such that, when the upper body of the passenger presses the pressure-receiving member of the seat back in more than a certain amount, the headrest always moves forwardly upward, providing restraint even when the restraint by the headrest is not needed.

It is an object of the present invention to provide a vehicular seat in which a headrest is allowed to move only when an early restraint of passenger's head is needed.

An aspect of the present invention to achieve the object is vehicular seat comprising a seat back, a headrest mounted to the seat back and movable at least forward from a set position, a linking mechanism provided to the seat back, and configured to transmit an inertial force due to a load by a passenger's body acting on the seat back, causing the headrest to move forward, a detector configured to perform a detection of contact of the passenger's body with the headrest, and a canceler configured to cancel transmission of the inertial force by the linking mechanism when contact of the passenger's body with the headrest is detected by the detector.

According to this aspect of the present invention, the headrest is moved forward in response to an inertial force that is transmitted by the linking mechanism when the load of the passenger's body acts on the seat back due to a vehicle collision or the like, thereby enabling quick restraint of the head of the passenger. In addition, when the detector detects that the passenger's body has come into contact with the headrest, the canceler can cancel the transmission of inertial force by the linking mechanism. Thus, it is possible to block forward movement of the headrest, so that when a passenger sits in a seat in a relaxed condition, for example, the headrest is not needlessly caused to move forward, thereby improving comfort.

BRIEF DESCRIPTION OF THE DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1A:
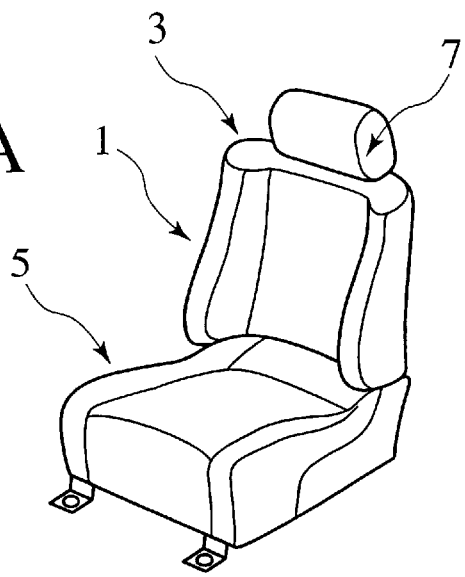
FIG. 1A and FIG. 1B show a first embodiment of the present invention, FIG. 1A being a perspective view of a vehicular seat, and FIG. 1B being a perspective view of the main parts.

There will be detailed below the preferred embodiments of the present invention, with reference to relevant accompanying drawings. Like elements are designated by like reference characters.

Figure 1B:
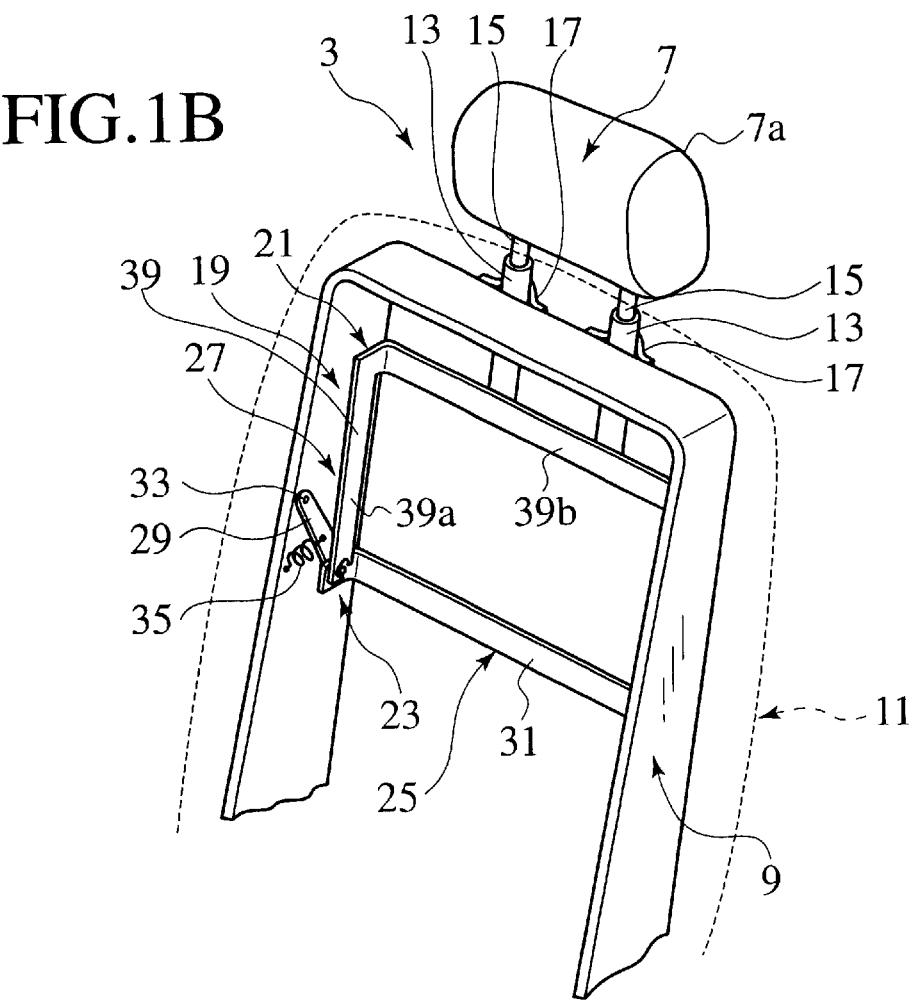

FIG. 1A shows a first embodiment of a vehicular seat 1 according to the present invention, in which a seat back 3 is reclinably supported with respect to a seat cushion 5, and in which a headrest 7 is mounted to the seat back 3. The seat back 3, as shown in FIG. 1B, is substantially formed by a seat back frame 9 and a seat back cushion 11 and, although not shown in the drawing, an S-shaped spring and lumbar supporting member and the like are mounted to the seat back frame 9.

The headrest 7 has a first stay 13 and a second stay 15 as headrest stays. The first headrest stay 13 is tubular in shape and is supported by a support 17 provided on the seat back frame 9. The first stay 13 is slidable in the axial direction with respect to the support 17 and, by a slight gap with respect to the support 17, can swing or undulate forward and back about the support 17 as a center.

The second stay 15 is joined to the headrest body 7a, is fitted into the first stay 13, and can freely be adjusted in position upward and downward along the axial direction of the first stay 13. The fixing of the up/down position of the second stay 15 with respect to the first stay 13 can be done, for example, by engaging a locking pawl mounted to the seat back 3 with respect to a number of grooved steps (not shown in the drawing) positioned up and down the second stay 15. This locking pawl can be unlocked by a passenger pressing a button of the locking mechanism enabling the second stay 15 to be moved upward and downward with respect to the first stay 13 in the axial direction, so as to adjust the vertical position of the headrest body 7a. After adjustment, the button is simply released, so that the locking pawl fits into and stops in a groove of the first stay 15, thereby fixing the position of the second stay 15.

The first embodiment of the present invention is provided with a linking mechanism 19, a detector 21, and a canceler 23.

When an inertial force acts on the seat back because of the body weight load of a passenger, the linking mechanism 19 transmits the inertial force so as to cause the headrest to move minimally forward, and in this embodiment so as to move the headrest forwardly upward.

The detector 21 detects contact by the body of the passenger with the headrest 7.

When the detector 21 detects that the body of the passenger is in contact with the headrest 7, the canceler 23 cancels the transmission of the inertial force by the linking mechanism 19.

More specifically, the linking mechanism 19 is formed by a inertial force receiver 25 movable supported by the seat back frame 9 of the seat back 3, and a driver 27 joined to the headrest 7 which, in concert with the inertial force receiver 25, causes the headrest 7 to move forward.

Figure 2:
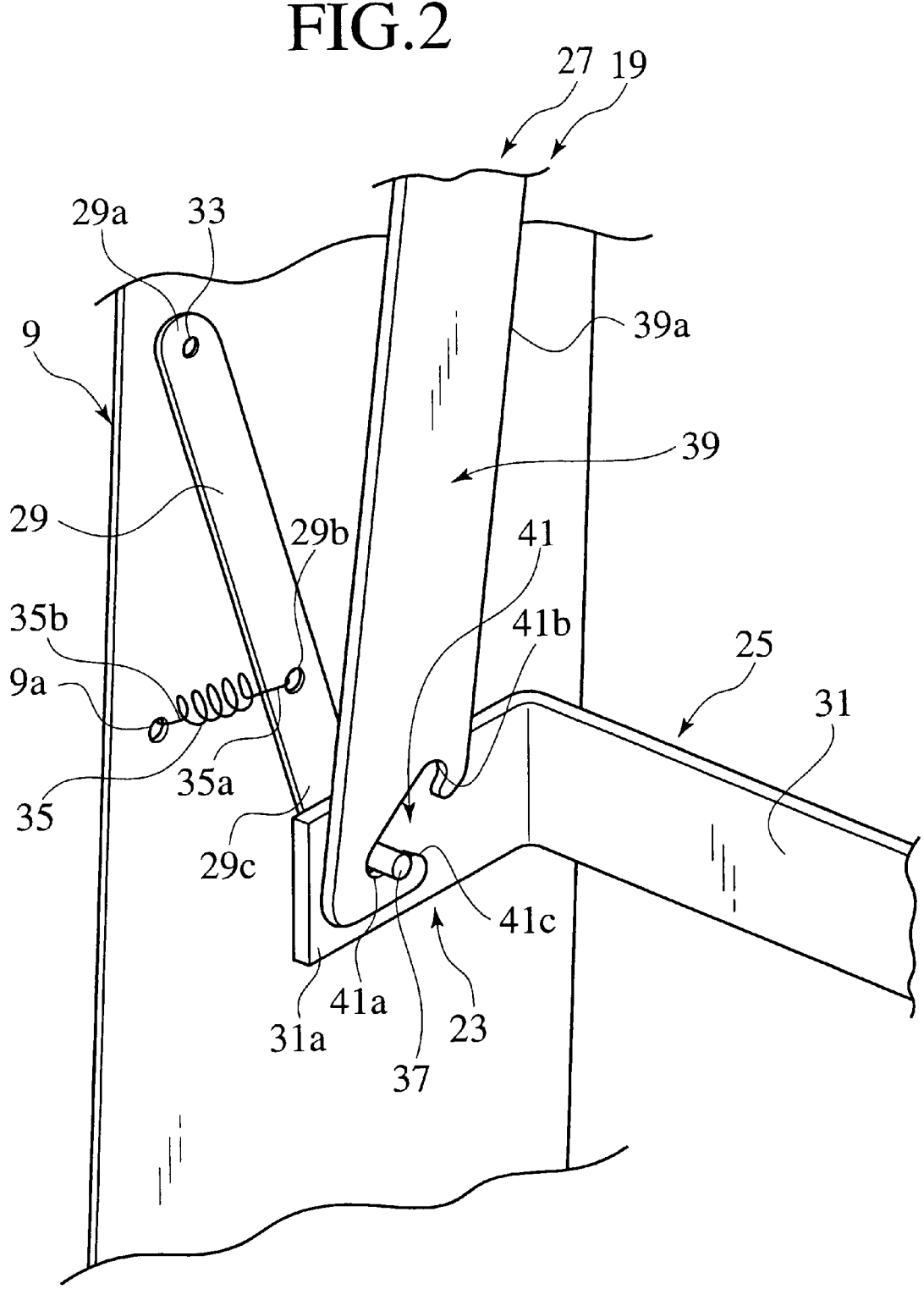
FIG. 2 is a partially enlarged perspective view of the first embodiment.
Figure 3:
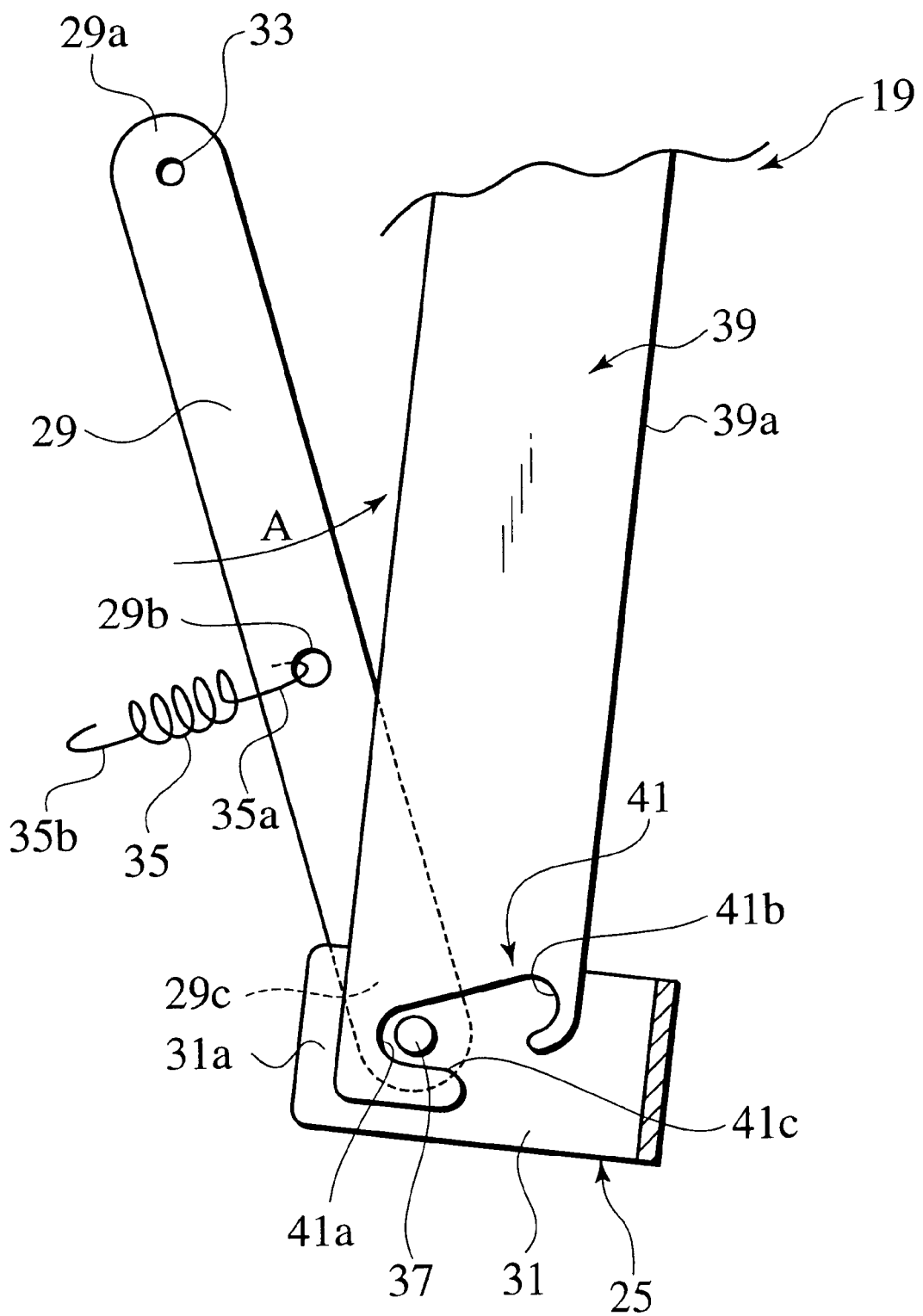
FIG. 3 is a side elevation of the first embodiment.

The inertial force receiver 25 is formed by a swing link 29 and a pressure receiver 31. A pair of swing links 29 is provided on the left and right inner surfaces of the seat back 9, although only the right-side swing link 29 is shown in FIG. 1B, the left-side swing link 29 being hidden in this view by the seat back frame 9. The mounting of the swing links 29 is done, as is clear from the enlarged perspective view of FIG. 2 and the enlarged side elevation of FIG. 3, by the upper end 29a, which is one end thereof, being mounted via an undulating pin 33 to the seat back frame 9 so as to allow frontward and backward movement.

A coil spring 35 is provided at the center part of the swing link 29, between the swing link 29 and the seat back frame 39. That is, an engaging hole 29b is provided in the swing link 29, into which is engaged an arm 35a of the coil spring 35. An engaging hole 9a is provided on the seat back frame 9, and an arm 35b of the coil spring 35 is engaged thereinto. The coil spring 35 is a pulling spring, which urges the swing link 29 in the forward direction. The lower end 29c, which is the other end of the swing link 29 is provided with a protruding pin 37, by which a side part 31a of the pressure receiver 31 is supported so as to permit swing thereof. The pressure receiver 31 extends to the left and right over the entire seat back frame 9.

Positioning when the swing link 29 is urged in the forward direction by the coil spring 35 is done, for example, by the interlocking pin 37 coming into contact with an engaging part 41a.

The driver 27 has a joining link 39 mounted to the first stay 13 as the headrest stay. The joining link is formed by engaging links 39a on both left and right sides, and a stay joining part 39b that extends from the left to the right between the upper ends of the engaging links 39a, the stay joining parts 39b being fixed at the lower end of the first stay 13, and cutouts 41 being provided at the lower ends of the engaging links 39a.

The cutout 41 has a positioning engaging part 41a, a drive engaging part 41b, and an opening 41c between the engaging parts 41a and 41b. The position engaging part 41a of the cutout 41 engages with the interlocking pin 37. The interlocking pin 37 and cutout 41 serve as engagers/disengagers (37 and 41) that form the engagement and disengagement effecter 23, providing mechanically linked disengagement by rearward movement of the headrest 7.

That is, when the headrest 7 is at a set position, the engagers/disengagers (37 and 41) enable engagement between the inertial force receiver 25 and the driver 27, thereby enabling transmission of the inertial force. When the headrest moves rearward, however, the driver 27 moves in concert therewith, thereby disengaging the engagement, so that inertial force is not transmitted.

Figure 4:
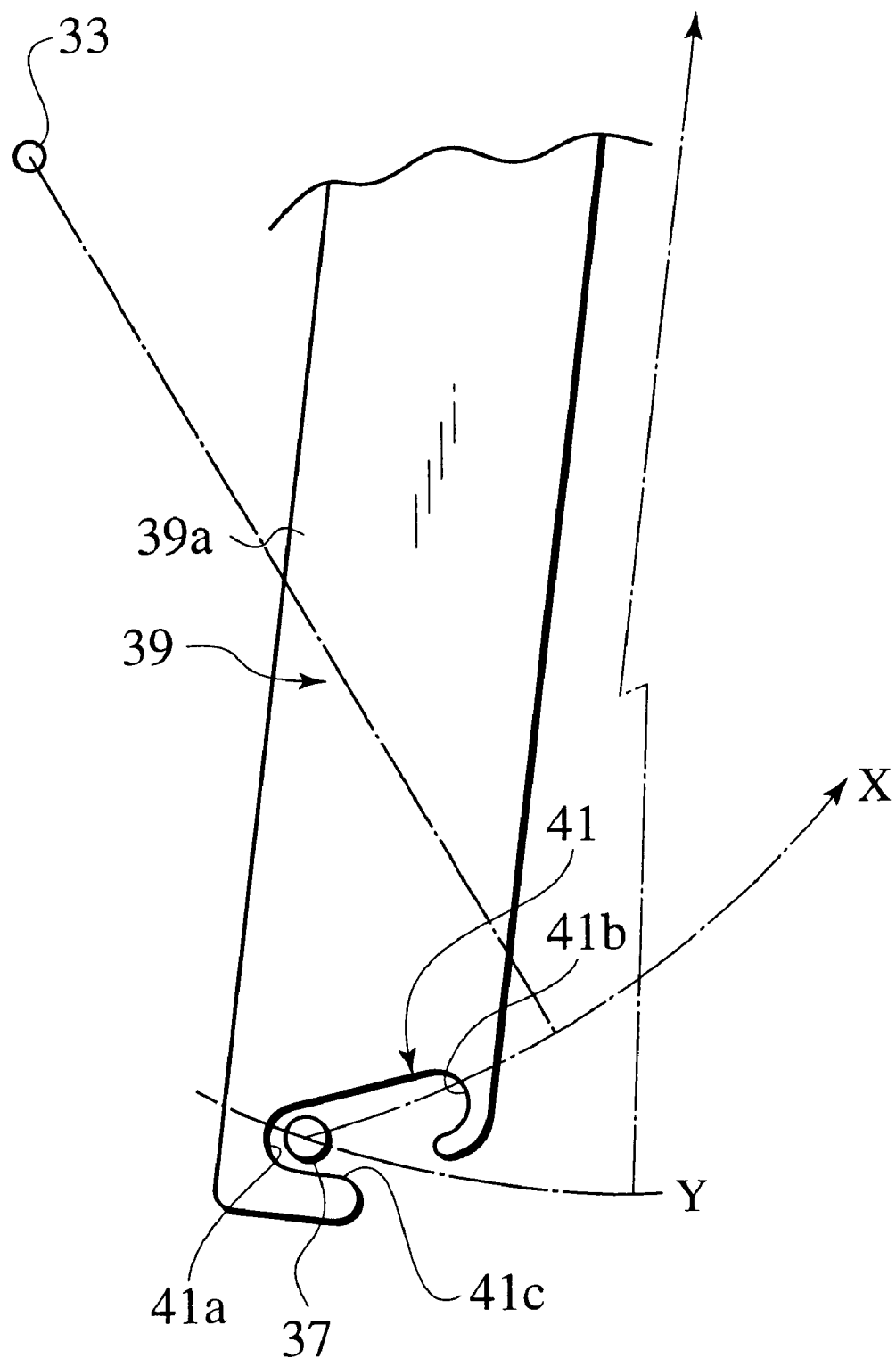
FIG. 4 is a drawing illustrating a path of an interlocking pin and cutout in the first embodiment.

Given the above, as shown in FIG. 4 when the swing link 29 undulates rearwards about the undulating pin 33 as the center at the set position of the joining link 39, the drive engaging part 41b of the cutout 41 is positioned above the path of movement X of the interlocking pin 37, thereby causing mutual engagement between the cutout 41 and interlocking pin 37 which form the engagement and disengagement effecter, and enabling transmission of inertial force. With the interlocking pin 37 at the set position, when the bottom of the first stay 13 of the headrest 7 undulates forward about the support 17 as a center, in response to which the joining link 39 undulates to forward, the interlocking pin 37 is positioned inside the center path Y of the opening 41c.

The detector 21 is formed by the joining link 39, the first and second stays 13 and 15, and the support 17, and when the headrest moves rearward, detects that the body of a passenger has come into contact with the headrest 7.

The operation of the present invention is described below.

With the headrest 7 at the set position, the swing link 29 in the forward direction by the coil spring 35, and the interlocking pin 37 engages with the positioning engaging part 41a of the cutout 41. By this action, the lower end of the engaging link 39a of the joining link 39 is urged forward, and the first stay 13 of the headrest 7 is positioned at the set position with respect to the support 17, via the stay joining parts 39b, the headrest 7 being held at the set position.

Figure 5:
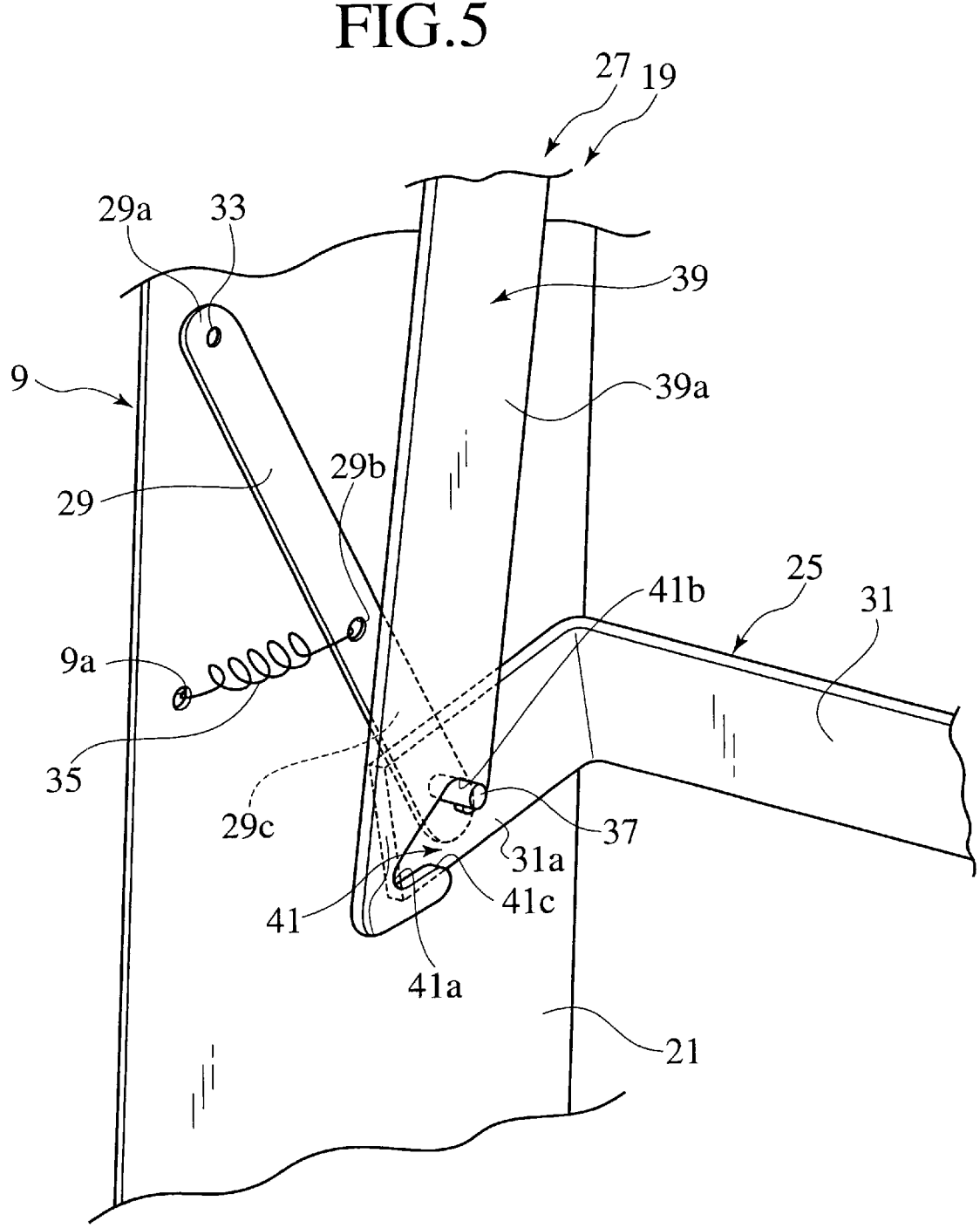
FIG. 5 is a perspective view illustrating a condition B in the first embodiment.
Figure 6:
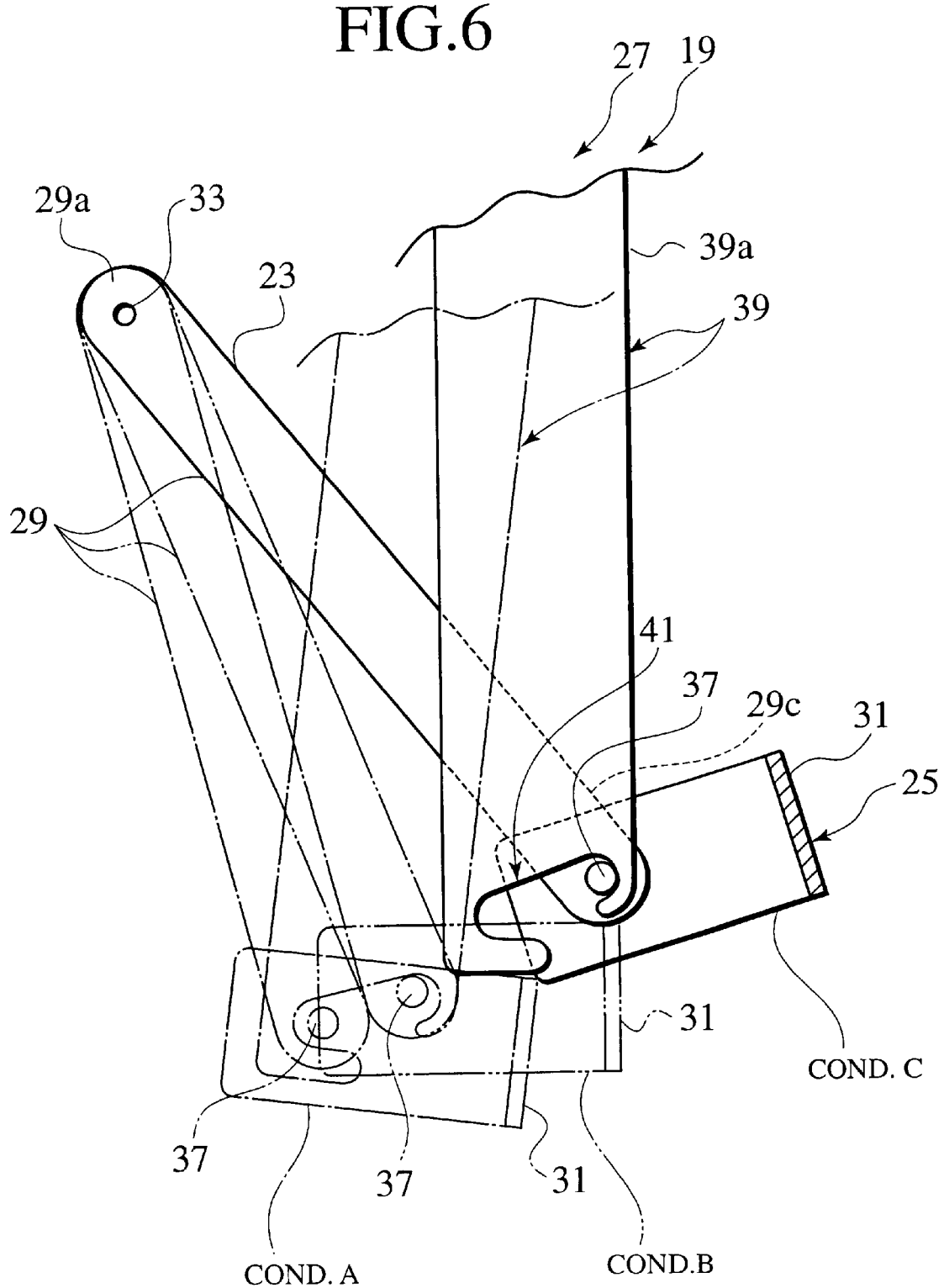
FIG. 6 is a side elevation illustrating conditions A, B, and C in the first embodiment.

Next, when the vehicle is subjected to a rear-end collision, when an inertial force caused by the body weight load of the passenger acts on the seat back 3, the upper body of the passenger pushing the pressure receiver 31 within the seat back 3 relative toward the rear of the vehicle. When the pressure receiver 31 moves toward the rear of the vehicle, the swing link 29 undulates toward the rear in the direction shown by the arrow A in FIG. 3, via the interlocking pin 37, about undulating pin 33 as a center. By this action, the interlocking pin 37 is engaged into the drive engaging part 41b, as shown in FIG. 5 and FIG. 6. That is, there is movement from the condition A of FIG. 2 and FIG. 3, in which it is possible to transmit inertial force, to the inertial force transmission condition B of FIG. 5 and FIG. 6.

When the pressure receiver 31 moves further to the rear by the inertial force, movement continues up until the condition C shown in FIG. 6. By this action, the lining pin 37 pushes up the drive engaging part 41b as it moves it from condition B to condition C. Therefore, the first stay 13 of the headrest 7 is pushed up, via the joining link, with respect to the support 17, and the upper end thereof rotates forward about the support 17 as a center.

Figure 7:
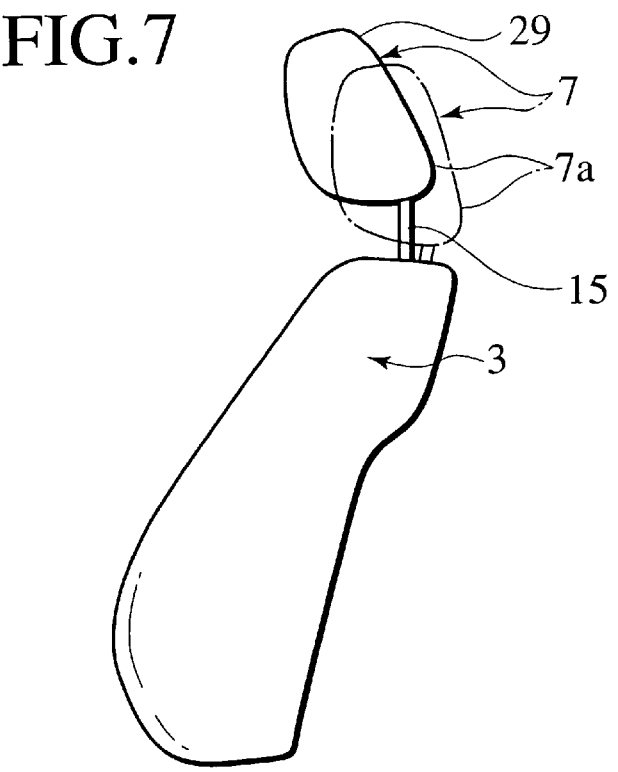
FIG. 7 is a simplified side elevation of a seat back illustrating a forwardly upward movement of a headrest in the first embodiment.

By the above-described action, the headrest body 7a move forward from the single-dot-dash line to the solid line in FIG. 7, that is, in this embodiment the headrest body 7a moves upward. In this manner, the headrest body 7a approaches close to the head of a passenger sitting in the vehicular seat 1, enabling quick restraint of the head of the passenger when a rear-end collision occurs.

When the passenger's inertial force is removed from the seat back 3, the urging force of the coil spring 35 causes the swing link 29 to undulate forward, the interlocking pin 37 engaging in the positioning engaging part 41a of the cutout 41, so that the joining pin 39 is urged into its original condition, thereby enabling resetting of the headrest 7 to its set position.

Figure 8:
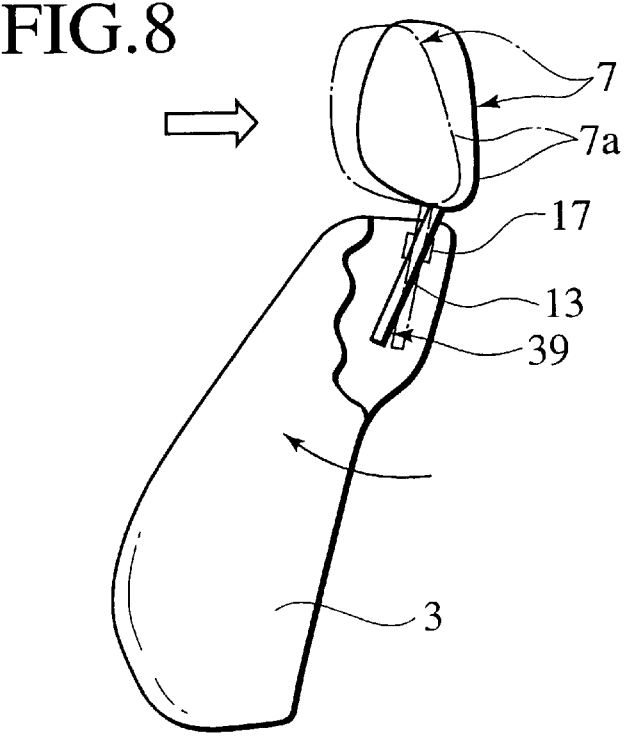
FIG. 8 is a partially cutaway side elevation of part of a seatback, illustrating a rearward movement of the headrest in the first embodiment.
Figure 9:
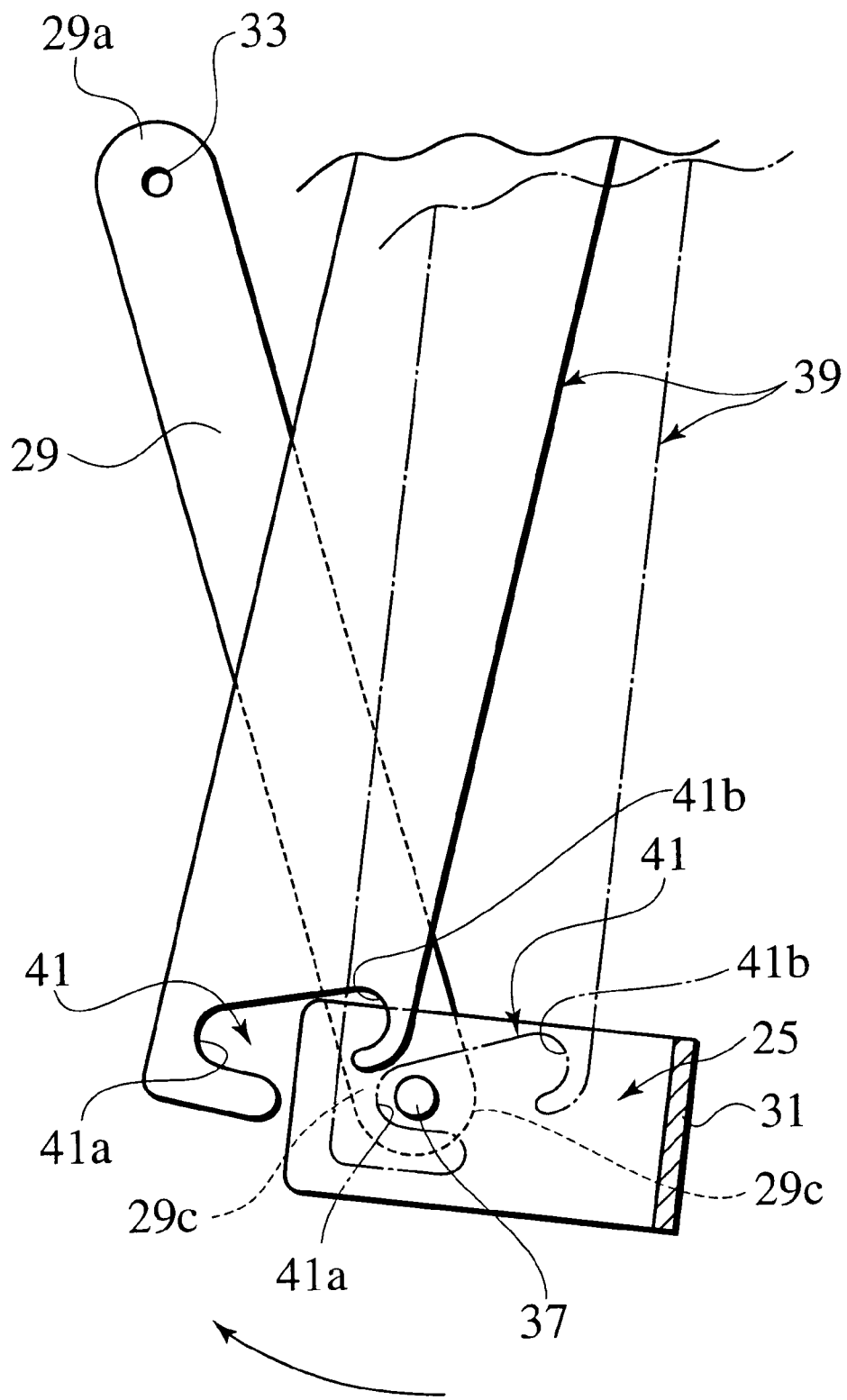
FIG. 9 is a partial side elevation illustrating a condition in which a joining link is released from the interlocking pin.

Next, when a passenger sits in the vehicular seat in a relaxed condition, so that the passenger's head comes into contact with the headrest body 7a, as shown in FIG. 8, the headrest body 7a moves rearward, from the single-dot-dash line indicating the set position, to the solid line indicating the rear position. That is, the lower end of the first stay 13 undulates forward, about the support 17 as a center. By this action, the joining link 39, as shown in FIG. 9, also moves from the set position, indicated by the single-dot-dash line, forward to the solid line, the cutout 41 being removed from the interlocking pin 37 by the opening 41c. That, the interlocking pin 37 and cutout 41 serving as the engagement and disengagement effecter release the engagement, so that the condition in which inertial force is not transmitted in enabled.

Then, as shown in FIG. 9, when the inertial force non-transmission condition is enabled, even if a load acts on the seat back from the upper body of the passenger, so that the pressure receiver 31 is pushed inward, the joining link 39 does not move in response to the inertial force, and the headrest 7 held in the same condition.

That is, when driving over a bumpy road, for example, vibration in a passenger's body occurs because of vehicle vibration, this resulting in the upper part of the passenger's body pushing the seat back 3 relatively rearward with the respect to the vehicle. When this occurs, via the interlocking pin 37 supporting the pressure receiver 31, even if the swing link 29 rotates about the undulating pin 33 as a center, because the interlocking pin 37 is not engaged with the drive engaging part 41b, the headrest 7 does not move forwardly upward as noted above.

In the case in which the head, for example, of the passenger is in contact with the headrest 7, the headrest 7 does not move and possible cause discomfort to the passenger, thereby enabling the maintenance of comfort for the passenger.

From this condition, if the passenger's head, for example, moves away from the headrest 7, in the condition shown by the solid line in FIG. 9, by rebounding of the seat back cushion 11 which had been deformed, the joining link 39 returns to the position shown by the single-dot-dash line of FIG. 9, and the positioning engaging part 41a of the cutout 41 engages with the interlocking pin 37, so as to return to condition A. It is therefore possible to enable a condition in which the seat is ready for the occurrence of a rear-end collision, for example.

Figure 10:
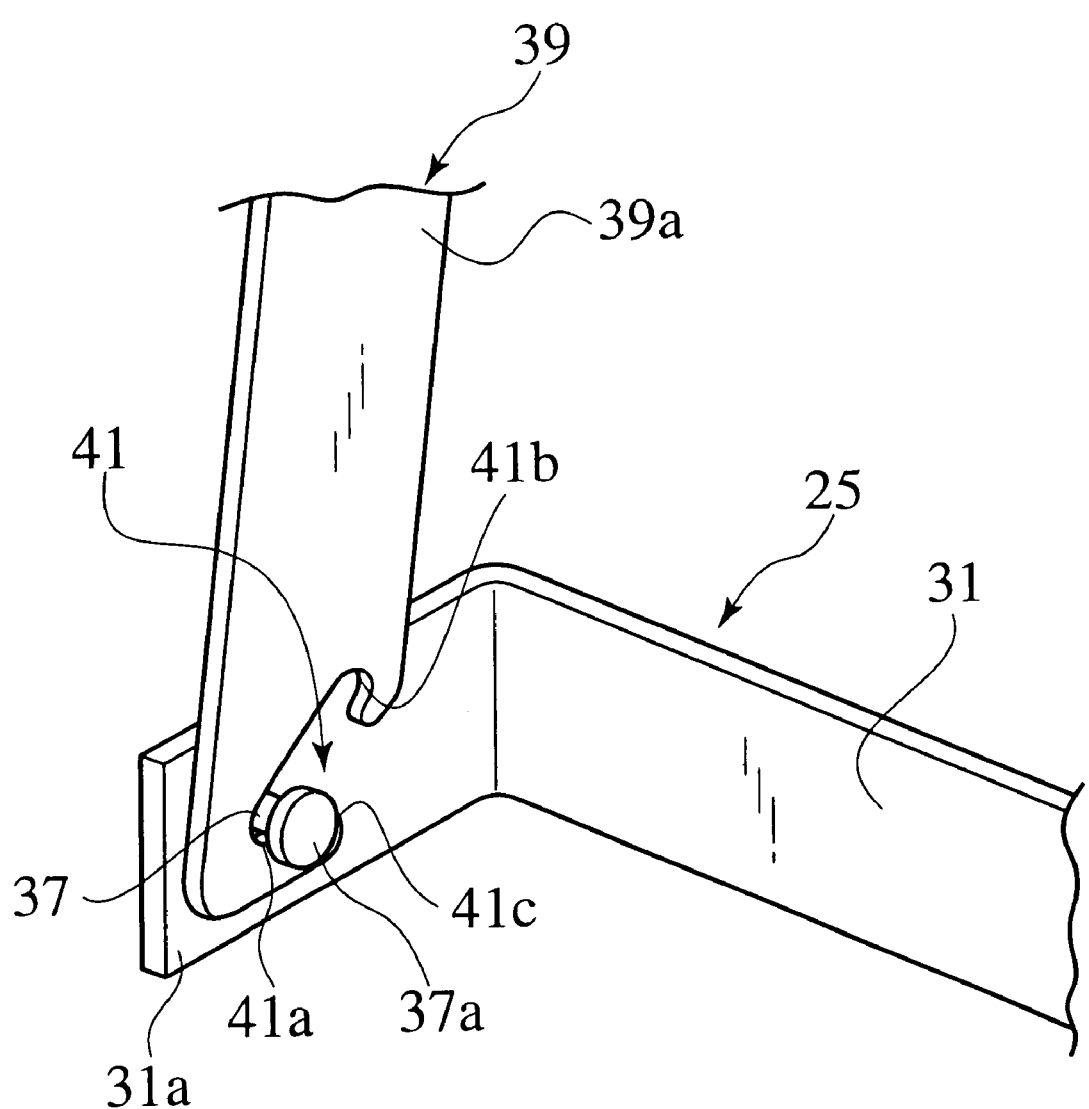
FIG. 10 is a partial perspective view of an example in which the interlocking pin is provided with an end cap.

FIG. 10 shows the case in which an end cap 37a is provided on the interlocking pin 37. This end cap 37a is mounted to the end of the interlocking pin 37 by screwing it thereonto, for example. The effect of this end cap 37a is that, even if a twisting occurs in the engaging link 39a of the joining link 39, the end cap 37a engages with the area surrounding the cutout 41, thereby preventing an undesirable disengagement between the cutout 41 and the interlocking pin 37, making it possible to establish reliable transmission of inertial force.

Figure 11:
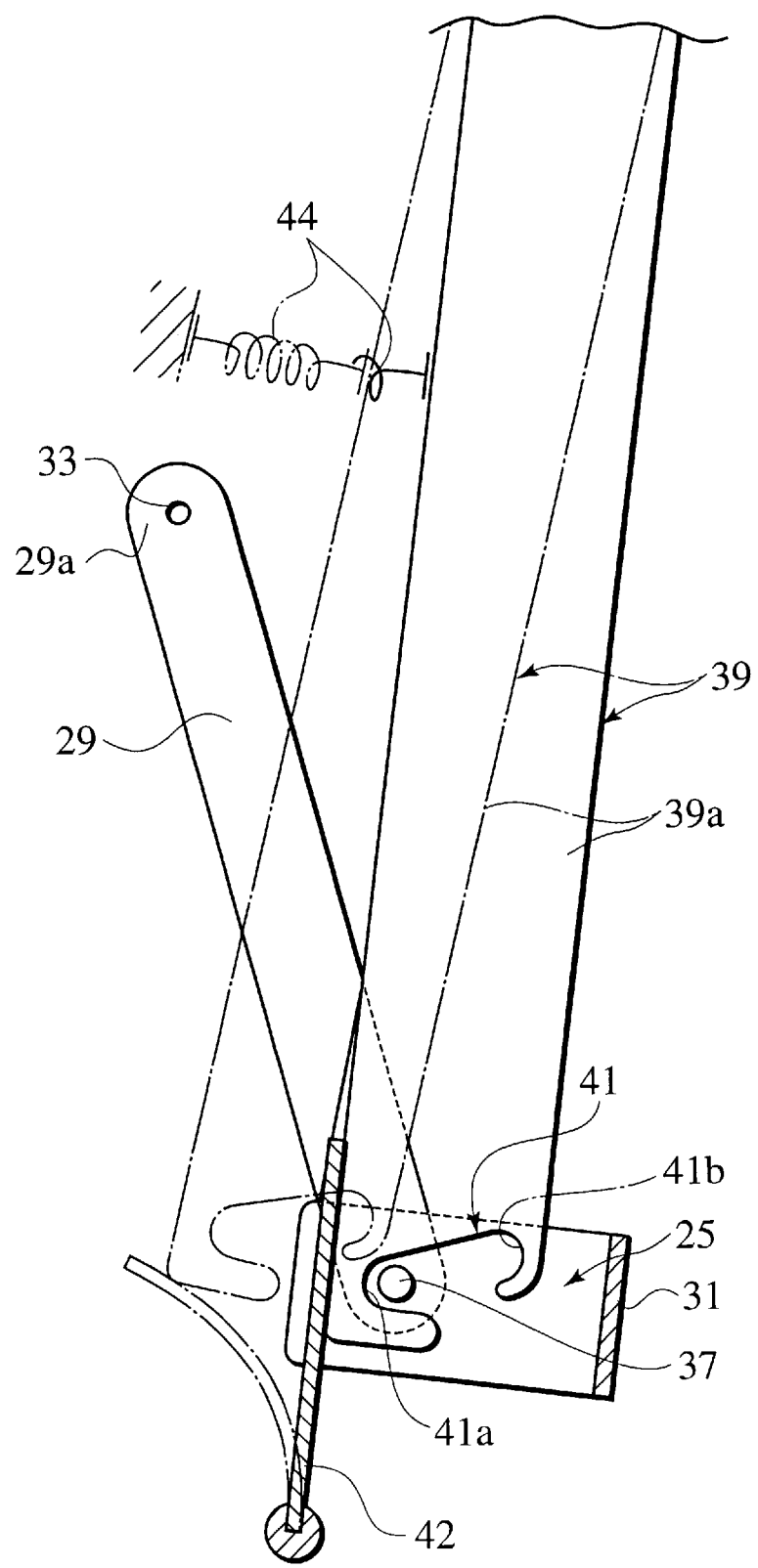
FIG. 11 is a partial side elevation illustrating a relationship between the joining link and a coil spring.

FIG. 11 shows an improvement in the rebounding of the headrest 7 when the head of a passenger in contact therewith moves away from the headrest 7. With this improvement, the seat back frame 9 is supported by a leaf spring 42, which causes a spring-loaded contact with respect to the lower end of the engaging link 29a of the joining link 39, by which there is urging force toward the rear.

A coil spring 44 is disposed between the seat back frame 9 and the engaging link 39a of the joining link 39, thereby imparting a rearward urging force to the engaging link 39a in the same manner.

As a result of the urging forces of the leaf spring 42 and coil spring 44, after the head of a passenger comes into contact with the headrest 7, when it subsequently moves away from the headrest 7, the engaging link 39a of the joining link 39 is urged to moved from the condition shown by the single-dot-dash line to that shown by the solid line, thereby causing rebounding to the set position, and achieving reliable operation.

In order that these urging forces achieve reliable engagement between interlocking pin 37 an the drive engaging part 41b of the cutout 41, the leaf spring 42 and the coil spring 44 made of a urging member that urges the engagement and disengagement effecter in the direction of engagement. It will be understood that it is also possible to provide just one of the leaf spring 42 and coil spring 44 and still achieve the same type of effect.

Figure 12:
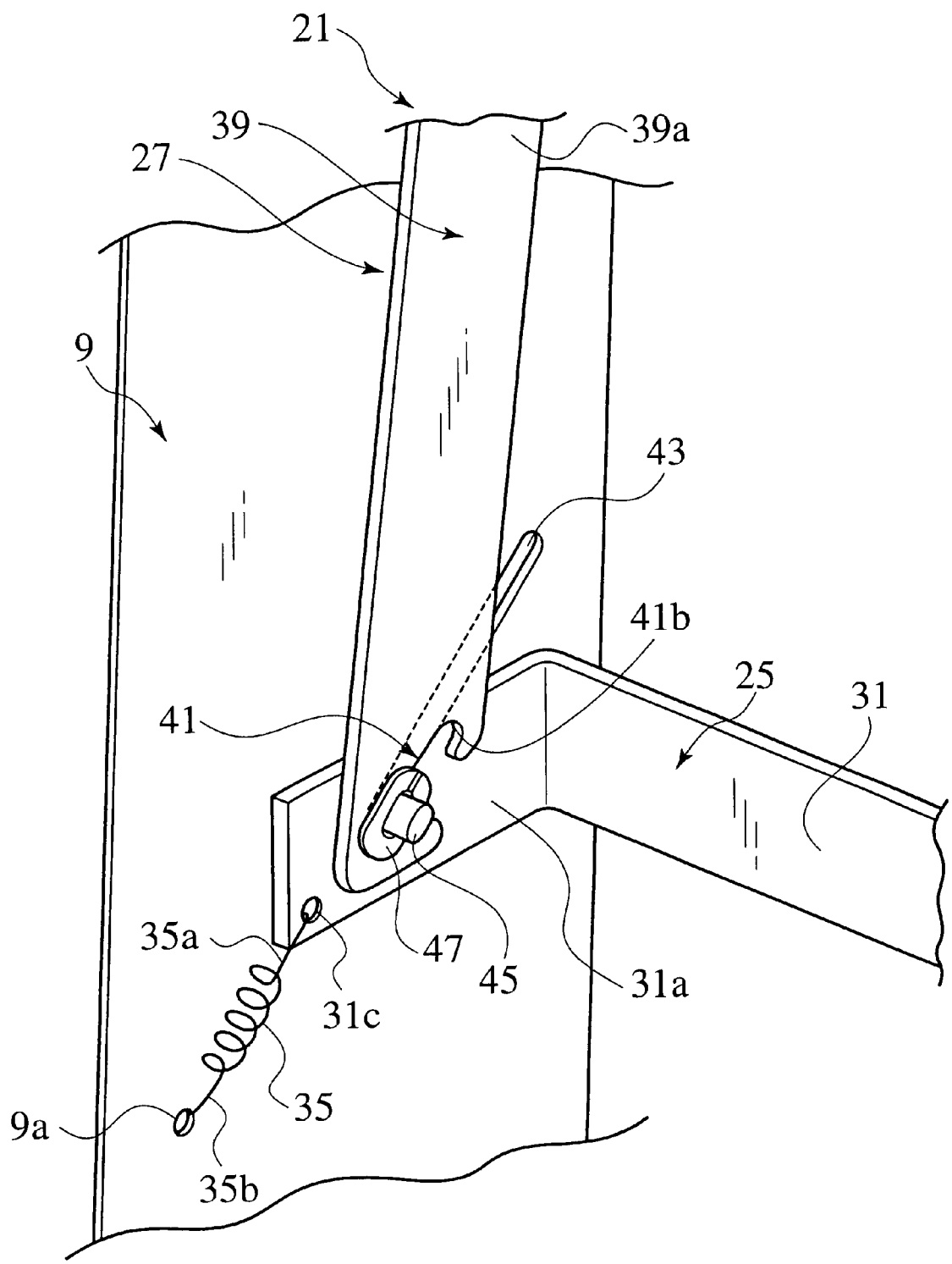
FIG. 12 is a partial perspective view of a second embodiment of the present invention.
Figure 13:
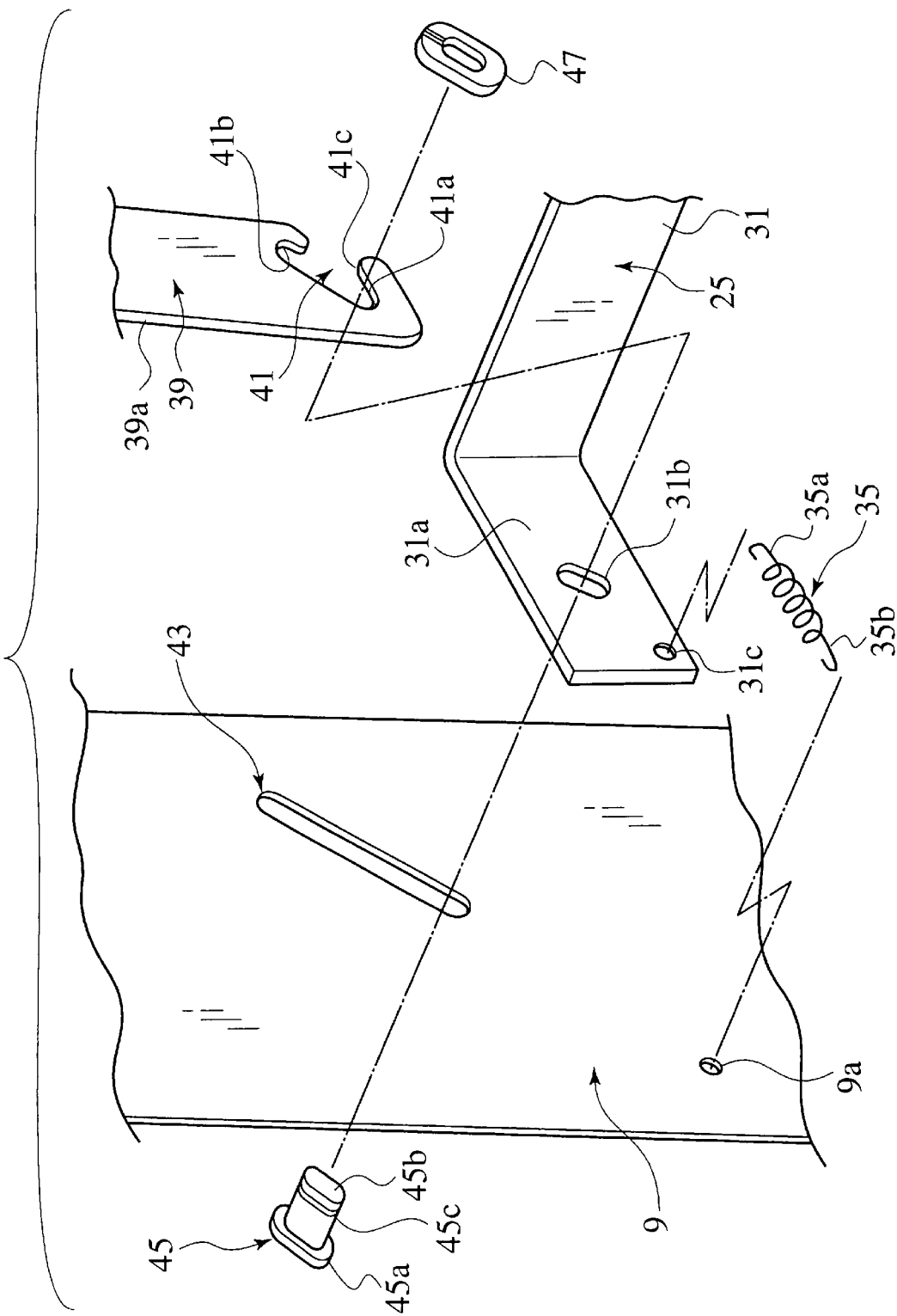
FIG. 13 is an exploded perspective view of the second embodiment.

FIG. 12 and FIG. 13 show a second embodiment of the present invention, the former being a partial perspective view thereof, and the latter being an exploded perspective view thereof. Elements corresponding to elements described for the first embodiment are assigned the same reference numerals, and are not explicitly described herein.

In the second embodiment, the inertial force receiver 25 is made up of an elongated hole 43, a guide pin 45, and a pressure receiver 31. The elongated hole 43 is formed in the seat back frame 9, and is provided at a incline, with the rear part being higher. The guide pin 45 has a head 45a and a shaft 45b, and the shaft 45b has a groove 45c into which a snap-ring 47 engages.

The shaft 45b of the guide pin 45 is formed so as to have a flattened cross-section, and when it is fitted into the elongated hole 43 and into a hole 31b of the pressure receiver 31, and also engaged in the positioning engaging part 41a of the cutout 41, the snap-ring 47 is mounted into the groove 45c. The snap-ring 47 prevents the guide pin 45 from pulling out.

The coil spring 35 is disposed along the direction of the elongated hole 43, an arm 35a at one end thereof being engaged with an engaging hole 31c formed in a side 31a of the pressure receiver 31.

In this embodiment as well, the urging force of the coil spring 35 urges the pressure receiver 31 forwardly upward, so that the guide pin 45 is positioned at the lower end of the elongated hole 43. Therefore, by the action of the positioning engaging part 41a of the cutout 41 being engaged with the shaft 45b of the guide pin 45, the joining link 39 is positioned at the set position, and the headrest 7 is maintained at the set position.

In this condition, if inertial force acts on the seat back 3 because of the body weight load of a passenger when a rear-end collision occurs, the pressure receiver 31 is pushed in rearwardly. When this occurs, the guide pin 45 moves along the elongated hole 43, and the guide pin 45 moves from the condition A, in which it is engaged with the positioning engaging part 41a of the cutout 41 to the condition B, in which it is engaged with the drive engaging part 41b.

If the pressure receiver 31 is pushed in further, the guide pin 45 moves further upward in the elongated hole 43, so that the lower side of the engaging link 39a moves to the rear and downward. Thus, it is possible for the headrest 7, in the same manner as in the first embodiment, to move forwardly upward, so as to quickly restrain the head of the passenger.

When the passenger's inertial force is removed from the seat back 3, the urging force of the coil spring 35 causes the pressure receiver 31 to return to its original position, the guide pin 45 engaging with the positioning engaging part 41a of the cutout 41, and the lower part of the joining link 39 returning to the original position, the result being that, similar to the case of the first embodiment, the headrest 7 can return to the set position.

When the body of the passenger comes into contact with the headrest 7, so that the headrest body 7a moves rearward, the cutout 41 moves away from the guide pin 45 via the opening 41c, so that the condition in which inertial force is not transmitted occurs. Therefore, when the passenger sits in the seat in a relaxed condition, it is possible to maintain comfort for the passenger, without movement of the headrest 7 imparting an uncomfortable feeling.

When the head of the passenger moves away from the headrest body 7a, the rebounding of the seat back cushion, for example, causes return of the joining link 39 to the set position, so that as shown in FIG. 9 the positioning engaging part 41a of the cutout 41 engages with the guide pin 45, thereby causing return to condition A, in which inertial force is transmitted.

The second embodiment can achieve the same effect as does the first embodiment. In the second embodiment, it is not necessary to have a swing link, and the construction is simplified. Because the motion of the pressure receiver 31 is restrained by the elongated hole 43, it is possible to reliably establish the set position of the headrest 7 and the position of the headrest 7 after it has moved forwardly upward.

Figure 14:
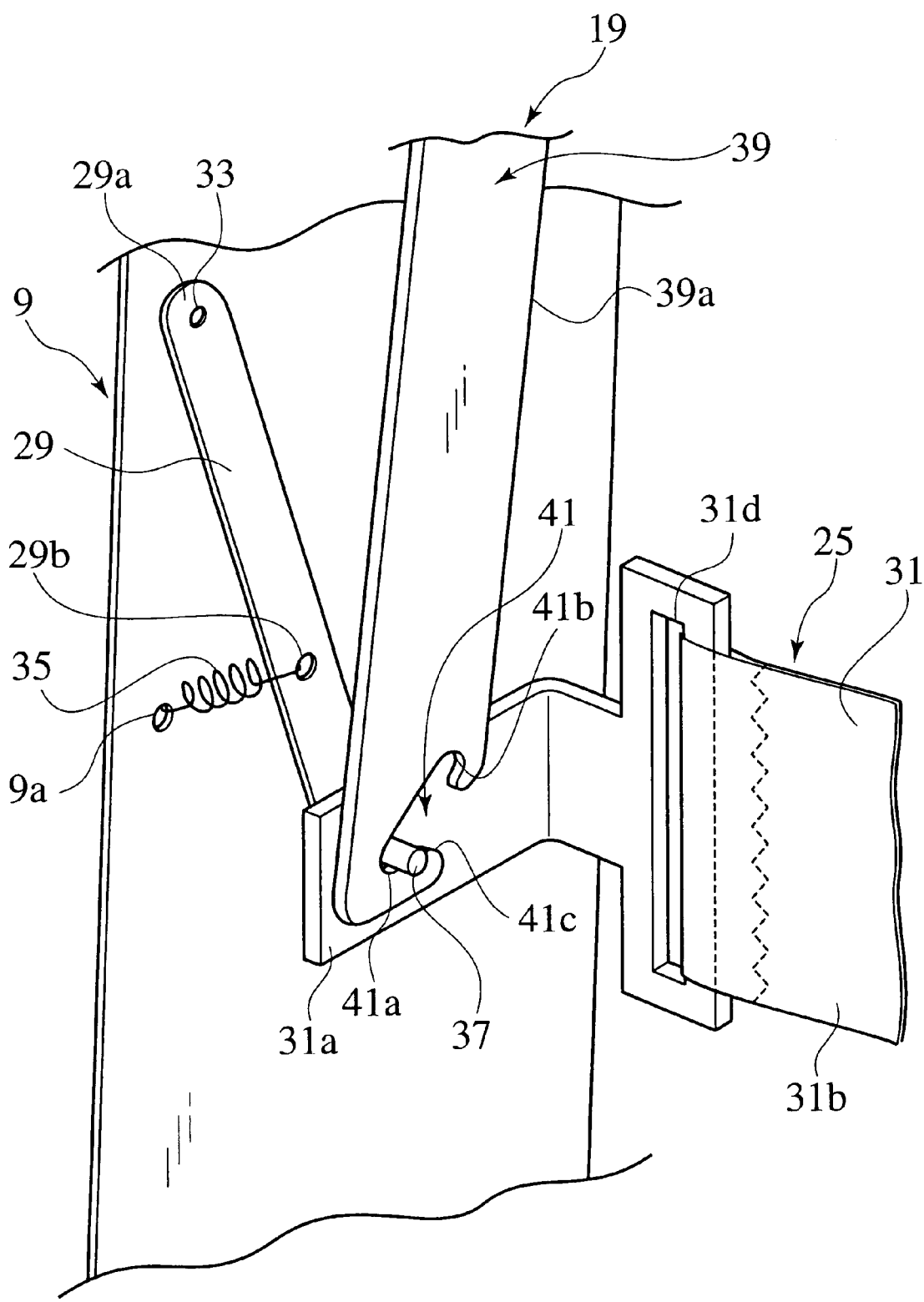
FIG. 14 is a partial perspective view of a third embodiment of the present invention.

FIG. 14 is a partial perspective view of a third embodiment, in which elements corresponding to elements of the first embodiment are assigned the same reference numerals and are not explicitly described herein.

In this embodiment, resilience to the pressure receiver 31, the front surface 31b of which is a fabric, and the side 31a of which is made of metal, for example. Ends of both sides of the front surface 31b are wound around a mounting hole 31d, and are sewn together to hold them in place. Other aspects of this embodiment are substantially the same as the first embodiment.

In this embodiment as well, therefore, by action of the pressure receiver being pushed in rearwards by an inertial force of the passenger, it is possible to achieve the same operating effect as the first embodiment. In this embodiment, however, because the front surface 31b of the pressure receiver 31 is made of fabric, in a case in which the passenger reclines against the seat back 3 in a relaxed condition, the pressure receiver does not give the passenger a feeling of discomfort. Thus, there is an improvement in comfort.

Rather than making the front surface 31b of the pressure receiver 31 of fabric, it can be an S-shaped spring, or a resin member or the like, which imparts resilience to the pressure receiver 31.

Figure 15:
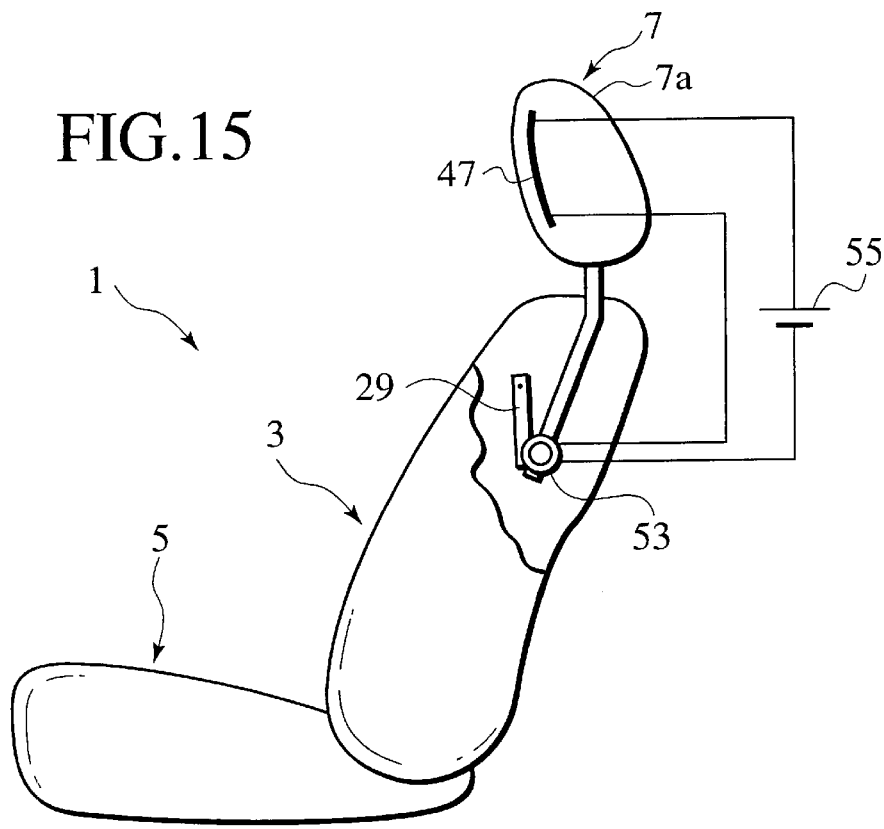
FIG. 15 is a partially cutaway side elevation of a vehicular seat according to a fourth embodiment of the present invention.
Figure 16:
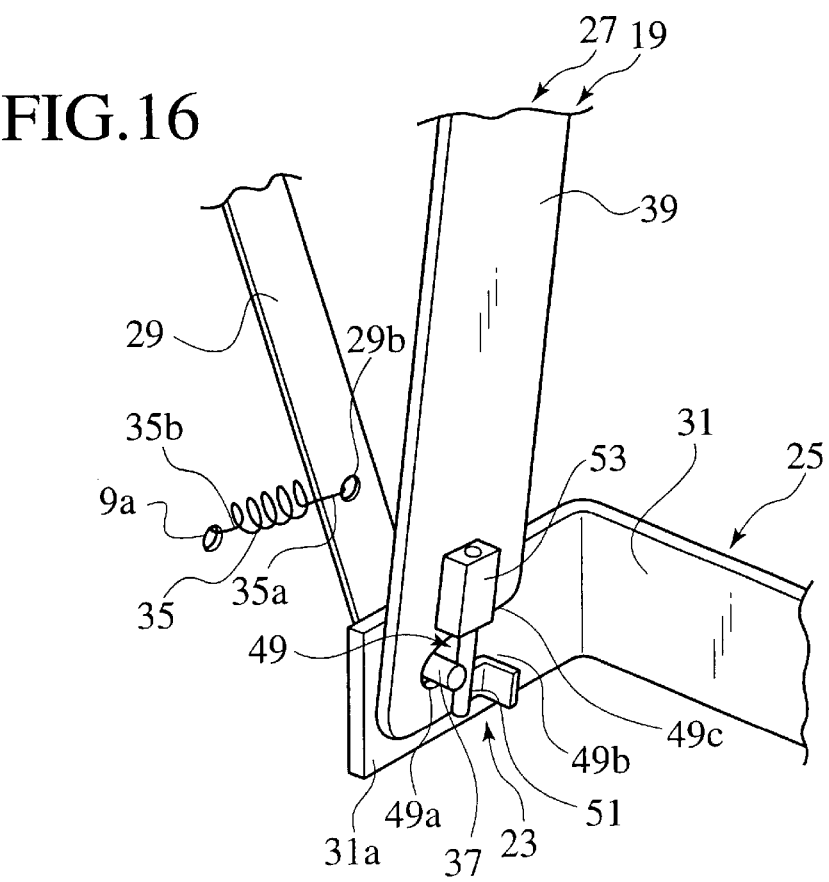
FIG. 16 is a partial perspective view of the fourth embodiment.
Figure 17:
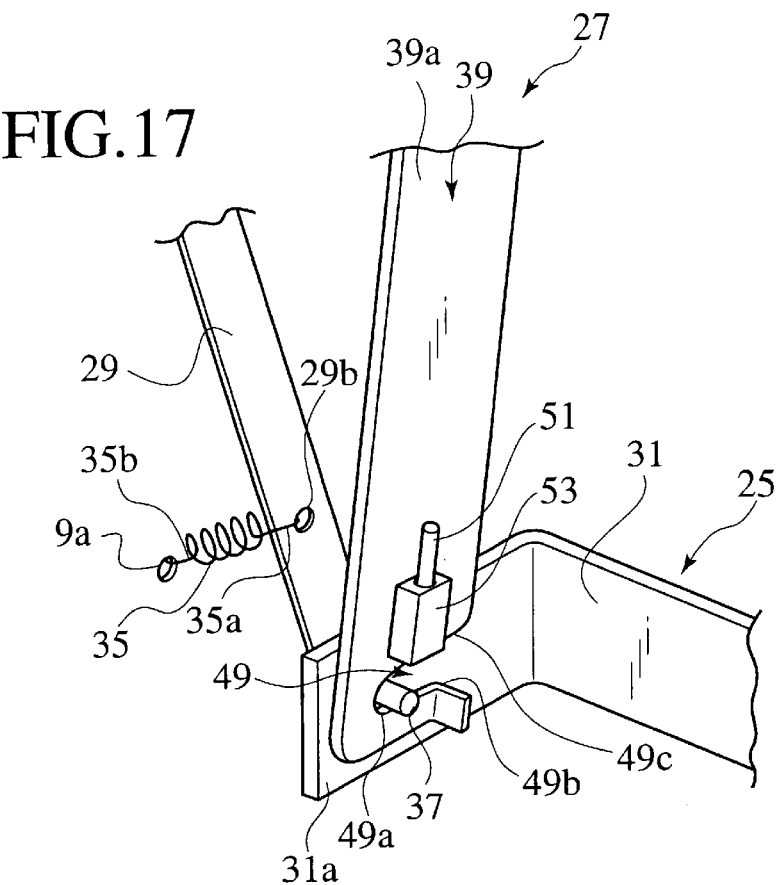
FIG. 17 is a partial perspective view of the fourth embodiment.

FIGS. 15 to 17 show a fourth embodiment of the present invention, FIG. 15 being a partially cutaway perspective view thereof, and FIGS. 16 and 17 being partial perspective views. In this embodiment as well, elements corresponding to elements of the first embodiment are assigned the same reference numerals, and are not explicitly described herein.

In this embodiment, the detector is an electrical contact sensor 47 provided within the headrest body 7a of the headrest 7, this electrical contact sensor 47 being turned on and off by a set load.

The canceler 23 is a engagement and disengagement effecter that is electrically disengaged by contact detection of the electrical contact sensor 47, and the engagement and disengagement effecter serving as the canceler 23 is formed by an interlocking pin 37 provided on one of the inertial force receiver 25 and the driver 27, and a cutout 39 provided on the other element thereof, and a locking pin 51 which engages and holes the interlocking pin 37 within the cutout 49, and releases this held condition by electromagnetic drive.

The interlocking pin 37, similar to the case of the first embodiment, is mounted to the lower end of the swing link 29, and supports the pressure receiver 31 so that the side 31a thereof can freely rotate. The cutout 49 is provided at the lower end of the engaging link 39a of the joining link 39, and a positioning engaging part 49a is provided on the side edge, the rear edge side having an opening 49b. The upper edge 49c of the cutout 49 is formed as an arc, along the path X (not shown in the drawing) of motion of the interlocking pin 37 when the swing link 29 undulates.

The locking pin 51 is driven by a solenoid 53, which is fixed to the joining link 39. The solenoid 53 forms a closed circuit with respect to the electrical contact sensor via a power supply 55.

When the passenger's head is not making contact with the headrest 7, therefore, the locking pin 51 protrudes as shown in FIG. 16, so that there is engagement with the interlocking pin 37 on the opposite side of the positioning engaging part 49a of the cutout 49.

When the electrical contact sensor 47 detects contact, the pressure receiver 31 of the inertial force receiver and the engaging link 39a of the joining link 39 are caused to engage, so that inertial force is transmitted. By doing this, when inertial force caused by the body weight load of the passenger causes the pressure receiver to be pushed inward, the interlocking pin 37 engages with the locking pin 51, and the lower part of the engaging link 39a moves rearward and down, so that the headrest 7 is caused to move forwardly upward, similar to the case of the first embodiment, thereby enabling quick restraint of the passenger's head.

When the passenger's head comes into contact with the headrest body 7a, this condition is detected by the electrical contact sensor 47, and the solenoid 53 drives the locking pin 51 so as to disengage it, as shown in FIG. 17, thereby enabling the condition in which inertial force is not transmitted.

Thus, even if inertial force is received from the upper body of the passenger because of vibration, for example, all that occurs is that the interlocking pin 37 linked thereto moves along the upper edge 49c of the cutout 49. For this reason, the joining link 39 of the driver 27 is kept at the set position, so that passenger comfort is maintained.

In this manner, the fourth embodiment achieves the same effect as the first embodiment. In this embodiment, even if there is no particular movement of the headrest 7, it is possible to enable the condition in which inertial force is not transmitted, thereby enabling space to be established behind the headrest 7 for the placement of objects for example, without hindering operation.

Figure 18:
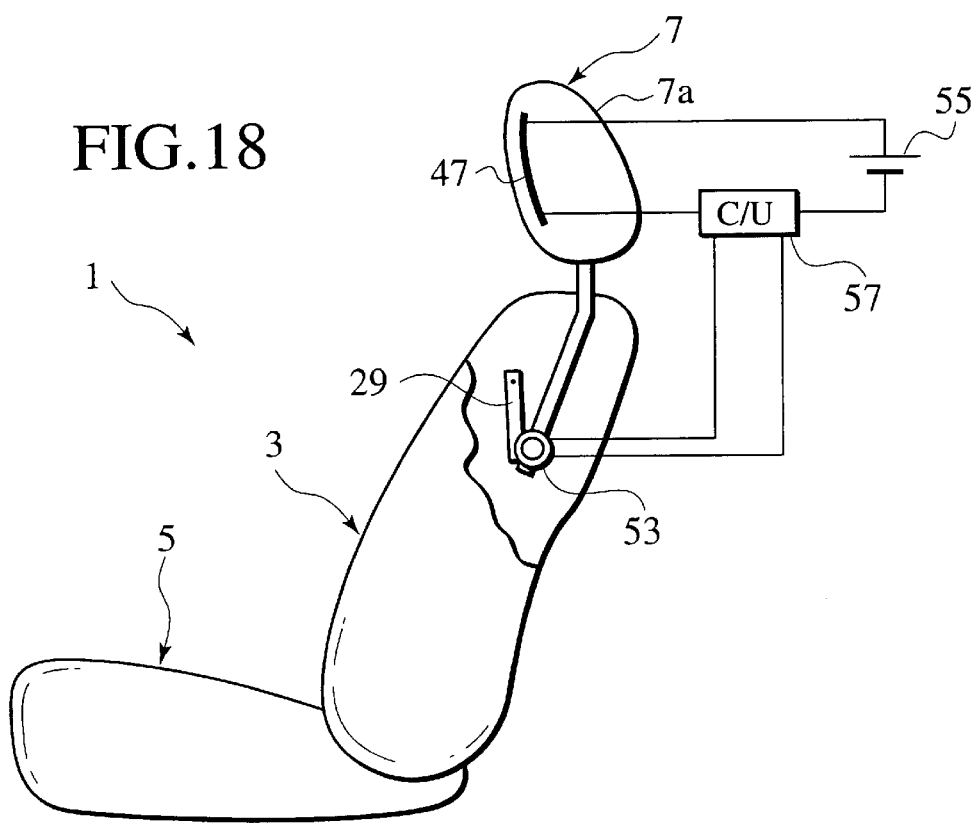
FIG. 18 is a partially cutaway side elevation of a modification of the vehicular seat according to the fourth embodiment.

FIG. 18 is a drawing showing a modification of the fourth embodiment of the present invention, in which a control unit 57 is disposed between the electrical contact sensor 47 and the solenoid 53. By doing this, it is possible to make a judgment responsive to the intensity of an electrical signal output from the electrical contact sensor 47 or from time-axis changes therein, this being used as the basis for controlling the solenoid 53.

That is, it is possible to perform a discrimination operation by the control unit 57 of a pinpoint load or passenger head load acting on the headrest body 7a, or to make a judgment as to whether a human head has made contact with the headrest body 7a based on the elapse of a given amount of time that a load is in contact therewith, thereby enabling reliable detection of the contact by the human head, and improving the control precision.

Figure 19:
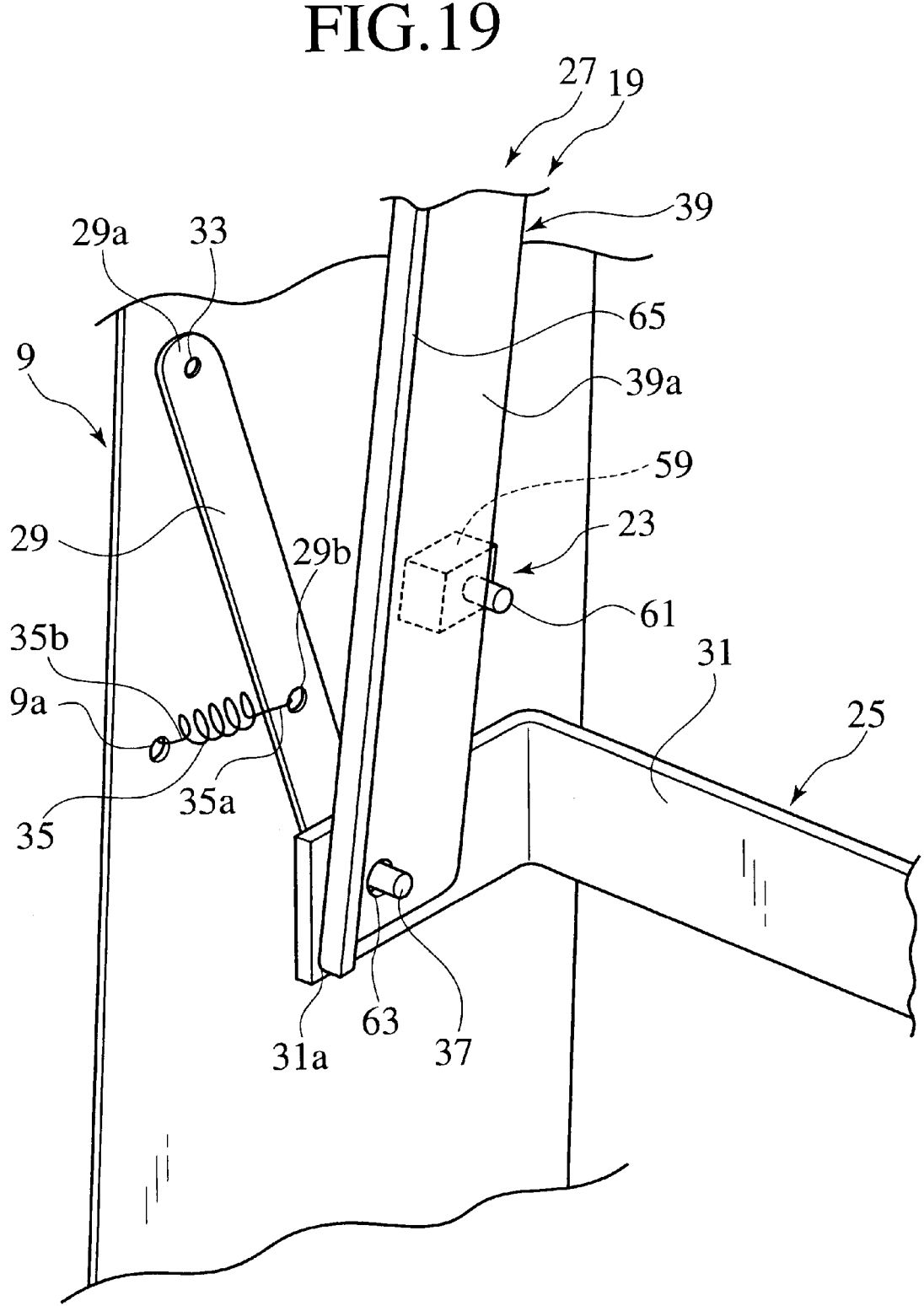
FIG. 19 is a partial perspective view of a fifth embodiment of the present invention.

FIG. 19 is a partial perspective view showing a fifth embodiment of the present invention, in which elements corresponding to elements in the first embodiment are assigned the same reference numerals and are not explicitly described herein.

In this embodiment, in the engagement and disengagement effecter serving as the canceler 23 the linking mechanism 19 is made releasable with respect to the seat back frame 9 of the seat back 3. That is, the locking mechanism of the canceler 23 has a locking pin 61 driving by a solenoid 59. The solenoid 59 is fixed to the outer side surface of the seat back frame 9 and, although not shown in the drawing, forms a closed circuit with the electrical contact sensor within the headrest body 7a and an external power supply, similar to the case of the fourth embodiment.

The locking pin 61 passes through the seat back frame 9 and protrudes toward the side of the engaging link 39a. Thus, the locking pin 61 locks the engaging pin 39a. A mating hole 63 is provided on the bottom part of the engaging link 39a, this mating with the interlocking pin 37.

When a passenger's head is not in contact with the headrest 7, therefore, the locking pin 61 of the canceler 23 is in a condition in which it does not protrude from the side of the seat back frame 9, so that the joining link 39 of the linking mechanism is in the unlocked condition, enabling transmission of inertial force.

For this reason, if the pressure receiver 31 is pushed rearward by the action of an inertial force caused by the body weight load of a passenger, the lower end of the joining link 39a move rearwardly downward, so that the headrest 7 moves forwardly upward, as in the first embodiment.

The effect of the passenger's head coming into contact with the headrest 7 is to cause the electrical contact sensor to sense the contact, so that the action of the solenoid 59 of the canceler 23 causes the locking pin 61 to protrude inward from the side of the seat back frame 9, thereby enabling the condition in which the engaging link 39a is engaged and locked. As a result of this, the condition is enabled in which inertial force is not transmitted, in which the movement of the linking mechanism 19 itself is locked. In this case as well, therefore, even if vibration occurs and causes the pressure receiver 31 to be pushed inward toward the rear, motion of the pressure receiver 31 is blocked, so that the headrest 7 does not move, thereby maintaining comfort for the passenger.

The locking of the linking mechanism 19 by the locking pin in this embodiment can be done by locking either the swing link or the pressure receiver 31.

Additionally, as shown in FIG. 19, a flange 65 is provided on the engaging link 39a of the joining link 39. By providing this flange 65, there is an improvement in the rigidity of the engaging link 39a of the joining link 39.

By doing this, twisting and the like of the engaging link 39a is prevented when a load acts thereon, so that the fitting between the interlocking pin 37 and the mating hole 63 is not released, thereby enabling reliable operation.

The flange 65 can be applied in the same manner to the structures described with regard to the first to fourth embodiments as well.

It is possible to employ a configuration without the flange 65, for example, in which a linkage is made between the lower ends of the engaging links 39a of the joining link 39 so as to improve the rigidity, thereby suppressing twisting and maintaining the engagement between the interlocking pin 37 and the cutout 41 or mating hole 63, for example.

As will be seen from the foregoing embodiments, according to an embodiment of the present invention, the detector performs the detection, as the headrest makes a rearward movement, and the canceler comprises an engagement and disengagement effecter mechanically interlockable with the rearward movement of the head rest, and releasable therefrom.

According to the embodiment, when the passenger's body comes into contact with the headrest, so that the headrest moves rearward, and the engagement and disengagement effecter mechanically linked to this rearward movement disengages, so that the headrest does not move forward. Thus, the mechanical linkage enables reliable movement of the canceler, thereby providing a reliable improvement in comfort.

According to another embodiment of the present invention, the linking mechanism comprises an inertial force receiver movably supported on the seat back, and a driver joined relative to the headrest and configured to be interlocked with the inertial force receiver to move the headrest forward, and the engagement and disengagement effecter is configured to effect an engagement between the inertial force receiver and the driver to achieve an inertial force transmittable state when the headrest is in the set position, and to be interlocked with the driver for disengagement from the engagement to achieve an inertial force non-transmittable state.

In the embodiment, when the headrest is in a set position, the engagement and disengagement effecter engages the inertial force receiver and the driver so as to enable transmission of inertial force, so that when the body weight load of the passenger acts on the seat back because of a vehicular collision, the inertial force receiver receives this and moves, the driver moving in concert via the engagement and disengagement effecter, so as to move the headrest forward. It is therefore possible to quickly restrain the head of the passenger. When the headrest moves rearward, the driver moves in concert, so that the engagement of the engagement and disengagement effecter is released, thereby enabling the condition in which inertial force is not transmitted. Therefore, even should there be a force acting on the inertial force receiver because of vehicular vibration or the like, this is not transmitted form the inertial force receiver to the driver, thereby preventing the forward movement of the headrest. It is therefore possible to maintain the comfort of a passenger who has sat in the seat in a relaxed condition.

According to another embodiment of the present invention, the engagement and disengagement effecter comprises an interlocking pin provided on one of the inertial force receiver and the driver, and a cutout provided on the other of the inertial force receiver and the driver.

According to the embodiment, in a simplified structure, the engagement and disengagement effecter is formed by an interlocking pin and cutout, with reliable establishment of a condition in which inertial force is transmitted and a condition in which inertial force is not transmitted.

According to another embodiment of the present invention, the detector comprises an electrical contact sensor provided on the headrest, and the canceler comprises an engagement and disengagement effecter configured to electrically effect an interlocking and a releasing in response to a contact detection by the electrical contact sensor.

According to the embodiment, when the passenger's body comes into contact with the headrest, this condition is detected by an electrical contact sensor, this detection being used to electrically disengage the engagement and disengagement effecter. Therefore, even if the headrest moves rearward, it is possible to cancel the transmission of inertial force by the linking mechanism, thereby enabling an improvement in comfort for a passenger who sits in the seat in a relaxed condition, and enabling application even in cases in which there is only limited space to the rear of the headrest.

According to another embodiment of the present invention, the linking mechanism comprises an inertial force receiver movably supported on the seat back, and a driver joined relative to the headrest and configured to be interlocked with the inertial force receiver to move the headrest forward, and the engagement and disengagement effecter is configured to effect an engagement between the inertial force receiver and the driver to achieve an inertial force transmittable state when the electrical contact sensor detects no contact, and to effect disengagement from the engagement to achieve an intertial force non-transmittable state.

According to the embodiment, when the electrical contact sensor does not detect contact, the engagement and disengagement effecter causes engagement between the inertial force receiver an the driver, thereby enabling transmission of inertial force. Therefore, when inertial force acts on the seat back because of the weight load of a passenger, the inertial force receiver moves, and the driver moves in concert with the inertial force receiver, enabling the headrest to be moved forward so as to quickly restrain the head of the passenger. When the electrical contact sensor detects contact, the driver moves to disengage the engagement and disengagement effecter, thereby enabling the condition in which inertial force is not transmitted, so that even if vehicle vibration or the like causes a force from the passenger to act on the seat back, it is possible to block forward movement of the headrest, thereby maintaining comfort for a passenger who has sat in the seat in a relaxed condition.

According to another embodiment of the present invention, the engagement and disengagement effecter comprises an interlocking pin provided on one of the inertial force receiver and the driver, a cutout provided on the other of the inertial force receiver and the driver, and a locking pin configured to have the interlocking pin engaged in, for a holding thereof by, the cutout and to release the holding by electromagnetic drive.

The embodiment enables engagement and holding of an interlocking pin in a cutout by means of a locking pin, so that when inertial force is received by the inertial force receiver because of the body weight load of the passenger, the headrest is reliably moved forward via the driver. When the electrical contact sensor detects contact, the load pin releases, by electromagnetic drive, the engagement and holding of the interlocking pin in the cutout, so that the headrest is not caused to move forward. The electrical contact detection and electromagnetic drive, therefore, give this aspect an enhanced reliability.

According to another embodiment of the present invention, the inertial force receiver comprises a swing link forwardly and rearwardly swingably supported at one end thereof by a seat back frame of the seat back, and a pressure receiver supported on another end of the swing link to extend leftward and rightward with respect to the seat back, and the driver has a joining link movably supported by the seat back frame and mounted to a headrest stay.

According to the embodiment, when inertial force acts because of the body weight load of the passenger on the seat back, the inertial force receiver receives the inertial force, and is moved rearward with respect to the seat back frame, via the swing link. By doing this, the joining link fixed to the headrest stay is moved via the engagement and disengagement effecter, so that the headrest stay moves. It is therefore possible to move the headrest supported by the headrest stay reliably forward.

According to another embodiment of the present invention, the inertial force receiver comprises an elongated hole provided in a seat back frame of the seat back, a guide pin to be guided by the elongate hole, and a pressure receiver supported by the guide pin to extend leftward and rightward with respect to the seat back, and the driver has a joining link movably supported by the seat back frame and mounted to a headrest stay.

According to the embodiment, when inertial force acts because of the body weight of the passenger on the seat back, the inertial force receiver receives the inertial force, causing guided movement of the inertial force receiver to the rear in the elongated guide pin hole, the movement of the inertial force receiver causing movement of the driver, via the engagement and disengagement effecter, so that the headrest stay moves. The headrest supported by the headrest stay, therefore, is reliably moved forward.

Another embodiment of the present invention is a variation wherein the pressure receiver is resilient.

According to the embodiment, by imparting resilience to the inertial force receiver, it prevents giving the passenger an uncomfortable feeling of being supported by the seat back.

Another embodiment of the present invention further comprises an urging member configured to urge the engagement and disengagement effecter in an engagement direction thereof.

According to the embodiment, by the urging of an urging member, the engagement and disengagement effecter reliably engages, so that when the passenger's body is not in contact with the headrest, if an inertial force acts on the seat back because of the body weight load of the passenger, it is possible to reliably move the headrest forward.

According to another embodiment of the present invention, the engagement and disengagement effecter comprises a locking mechanism configured to releasably lock the linking mechanism relative to a seat back frame of the seat back.

According to the embodiment, by locking the linking mechanism to the seat back frame by a locking mechanism, even if an inertial force acts on the seat back because of the body weight load of the passenger, it is possible to prevent forward movement of the headrest. By releasing the locking of the locking mechanism when contact is detected by the electrical contact sensor, if inertial force acts on the seat back because of the body weight load of the passenger, it is possible to reliably move the headrest forward, via the linking mechanism.

The contents of Japanese Patent Application No. 11-172765 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A vehicular seat comprising:
    a seat back;
    a headrest mounted on the seat back and movable at least forward from a set position;
    a linking mechanism linking the seat back to the headrest, the linking mechanism being comprised of
        an inertial force receiver movably supported on the seat back; and
        a driver joined relative to the headrest and configured to be interlocked with the inertial force receiver to move the headrest forward;
    a detector coupled to at least one of the seat back and the headrest so as to detect contact of the passenger's body with the headrest, the detector being comprised of
        at least one stay coupled to the driver; and
        at least one support coupling the seat back with the headrest,
        wherein when the headrest is at the set position, the at least one stay contacts the at least one support; and
    an engagement and disengagement effecter coupled to the linking mechanism to cancel movement of the linking mechanism when contact of the passenger's body with the headrest is detected by the detector, the engagement and disengagement effecter being mechanically interlockable with rearward movement of the headrest,
        wherein the engagement and disengagement effecter is configured to effect an engagement between the inertial force receiver and the driver to achieve an inertial force transmittable state when the headrest is in the set position, and to be interlocked with the driver for disengagement from the engagement to achieve an inertial force non-transmittable state.

2. A vehicular seat according to claim 1, wherein the engagement and disengagement effecter comprises an interlocking pin provided on one of the inertial force receiver and the driver, and a cutout provided on the other of the inertial force receiver and the driver.

3. A vehicular seat according to claim 1, wherein the inertial force receiver comprises a swing link forwardly and rearwardly swingably supported at one end thereof by a seat back frame of the seat back, and a pressure receiver supported on another end of the swing link to extend leftward and rightward with respect to the seat back, and wherein the driver has a joining link movably supported by the seat back frame and mounted to a headrest stay.

4. A vehicular seat according to claim 3, wherein the pressure receiver is resilient.

5. A vehicular seat according to claim 1, wherein the inertial force receiver comprises an elongated hole provided in a seat back frame of the seat back, a guide pin to be guided by the elongated hole, and a pressure receiver supported by the guide pin to extend leftward and rightward with respect to the seat back, and wherein the driver has a joining link movably supported by the seat back frame and mounted to the at least one stay.

6. A vehicular seat according to claim 1, further comprising an urging member configured to urge the engagement and disengagement effecter in an engagement direction thereof.

7. A vehicular seat comprising:

a seat back;

a headrest mounted to the seat back and movable at least forward from a set position;

linking means linking the seat back to the headrest for transmitting an inertial force due to a load by a passenger's body acting on the seat back from the seat back to the headrest;

detecting means coupled to at least one of the seat back and the headrest for detecting contact of the passenger's body with the headrest; and cancelling means coupled to the linking means for cancelling movement of the linking means when contact of the passenger's body with the headrest is detected by the detecting means.

8. A vehicular seat according to claim 7, wherein the detecting means detects rearward movement of the headrest, and wherein the canceling means comprises engaging and a disengaging means for mechanically interlocking the cancelling means to the linking means and being releasable therefrom.

9. A vehicular seat according to claim 8, wherein the linking means comprises inertial force receiving means movably supported on the seat back, and driving means joined relative to the headrest and interlockable with the inertial force receiving means to move the headrest forward, and wherein the engaging and disengaging means effects an engagement between the inertial force receiving means and the driving means to achieve an inertial force transmittable state when the headrest is in the set position, and is interlocked with the driving means for disengagement from the engagement to achieve an inertial force non-transmittable state.

10. A vehicular seat according to claim 9, wherein the inertial force receiving means comprises an elongated hole provided in a seat back frame of the seat back, a guide pin to be guided by the elongate hole, and pressure receiving means supported by the guide pin to extend leftward and rightward with respect to the seat back, and wherein the driving means has a joining link movably supported by the seat back frame and mounted to a headrest stay.

11. A vehicular seat according to claim 7, wherein the detecting means comprises electrical contact sensing means provided on the headrest, the cancelling means comprises engaging and disengaging means for electrically effecting an interlocking and a releasing in response to a contact detection by the electrical contact sensing means, the linking means comprises inertial force receiving means movably supported on the seat back, and driving means joined relative to the headrest and interlockable with the inertial force receiving means to move the headrest forward, and the engaging and disengaging means effects an engagement between the inertial force receiving means and the driving means to achieve an inertial force transmittable state when the electrical contact sensing means detects no contact, and effects disengagement from the engagement to achieve an intertial force non-transmittable state.

12. A vehicular seat according to claim 11, wherein the engaging and disengaging means comprises an interlocking pin provided on one of the inertial force receiving means and the driving means, a cutout provided on the other of the inertial force receiving means and the driving means, and a locking pin for having the interlocking pin engaged in, for a holding thereof by, the cutout and for releasing the holding by electromagnetic drive.

* * * * *